United States Patent
Sakagami

(10) Patent No.: US 7,132,095 B2
(45) Date of Patent: Nov. 7, 2006

(54) METHOD AND DEVICE FOR MANUFACTURING ZEOLITE FROM ASHES RESULTING FROM THE INCINERATION OF COMBUSTIBLE WASTE

(76) Inventor: Etsuro Sakagami, 11-14, Minaminaruse 6-chome, Machida-shi, Tokyo 194 0045 (JP)

( * ) Notice: Subject to any disclaimer, the term of this patent is extended or adjusted under 35 U.S.C. 154(b) by 181 days.

(21) Appl. No.: 10/690,590

(22) Filed: Oct. 23, 2003

(65) Prior Publication Data

US 2004/0101476 A1    May 27, 2004

(30) Foreign Application Priority Data

Oct. 25, 2002   (JP) .............................. 2002-311460

(51) Int. Cl.
*C01B 39/02* (2006.01)
(52) U.S. Cl. ..................................... 423/712
(58) Field of Classification Search ................ 423/710, 423/711, 712, 700
See application file for complete search history.

(56) References Cited

U.S. PATENT DOCUMENTS 4,310,496 A * 1/1982 Achenbach et al. ........ 423/712
6,299,854 B1 * 10/2001 Henmi et al. ............... 423/700
6,368,571 B1 * 4/2002 Vempati ..................... 423/709
6,451,282 B1 * 9/2002 Siklosi et al. ............... 423/712
6,663,845 B1 * 12/2003 Hasuyama et al. ......... 423/700

FOREIGN PATENT DOCUMENTS

JP            10324518 A  * 12/1998
JP          2002193613 A  *  7/2002

* cited by examiner

*Primary Examiner*—David Sample
(74) *Attorney, Agent, or Firm*—Lowe Hauptman & Berner LLP

(57) ABSTRACT

To provide a substance separating/recovery method using a superconductive magnetic field that separate and recover substances efficiently, to make the ashes harmless, and to generate zeolite. The method of the present invention includes: (1) a step, wherein the ashes resulting from the incineration of combustible waste are (a) introduced into a first tank 2 to form a liquid that contains, as a solvent, an alkaline aqueous solution or water, air, and electrolytic water, and (b) continuously reinjected into a first substance-separating/recovering device 1A to make the ashes harmless, and (2) a step, wherein clear water, which recovered in the first substance-separating/recovering device 1A and then returned to the first tank 2, is (c) introduced into a second tank 3 to form a heat-treated liquid that contains, an alkaline aqueous solution, and (d) continuously reintroduced into a second substance-separating/recovering device 1B to crystallize that heat-treated liquid into zeolite.

5 Claims, 11 Drawing Sheets

Fig.4

| Classification | Fe | Mn | Cd | Pb | Cu | Zn |
|---|---|---|---|---|---|---|
| Pre-treatment drainage (mg/L) | 5.3 | 14.0 | 0.098 | 0.037 | 1.2 | 1.5 |
| Post-treated drainage (mg/L) | 0.4 | 0.2 | 0.006 | 0.002 | 0.02 | 0.02 |
| Separation (%) | 92 | 98 | 93 | 94 | 98 | 98 |

Figure 7. Pretreatment Drainage

| Item | Results of Measurement | | Measurement Method | Drainage Reference Value |
|---|---|---|---|---|
| Water Temperature (°C) | 16 | (°C) | | |
| SS | 49 | (mg/l) | As in Exhibit 8 of Official Notice No. 59 of Ministry of the Environment | 60 |
| n-Hex Extracted substances | 2.6 | (mg/l) | As in Exhibit 4 of Official Notice No. 64 of Ministry of the Environment | 5 (30) |
| (T-N) Total nitrogen | 510 | (mg/l) | JIS K 0102 45.2 | |
| (T-P) Total phosphorus | 2.3 | (mg/l) | JIS K 0102 46.3 | |
| (Cd) Cadmium | 24 | (mg/l) | JIS K 0102 55-2 | 0.1 |
| (Pb) Lead | 180 | (mg/l) | JIS K 0102 54-2 | 0.1 |
| (6-Cr) Chromium (VI) | less than 0.05 | (mg/l) | JIS K 0102 65-2 | 0.5 |
| (As) Arsenic | 0.07 | (mg/l) | JIS K 0102 61-2 | 0.1 |
| (T-CN) Total cyanogen | 0.4 | (mg/l) | JIS K 0102 38-2 | 1 |
| (T-Hg) Total mercury | 0.18 | (mg/l) | As in Exhibit 1 of Official Notice No. 59 of Ministry of the Environment | 0.005 |
| PCBs | less than 0.0005 | (mg/l) | As in Exhibit 3 of Official Notice No. 59 of Ministry of the Environment | 0.003 |
| Trichloroethylene | less than 0.001 | (mg/l) | JIS K 0125 5.2 | 0.3 |
| Tetrachloroethylene | less than 0.001 | (mg/l) | JIS K 0125 5.2 | 0.1 |
| 1,1,1-trichloroethane | less than 0.001 | (mg/l) | JIS K 0125 5.2 | 3.0 |
| Dichloromethane | less than 0.001 | (mg/l) | JIS K 0125 5.2 | 0.2 |
| Carbon tetrachloride | less than 0.001 | (mg/l) | JIS K 0125 5.2 | 0.02 |
| (Se) Selenium | less than 0.12 | (mg/l) | JIS K 0102 67.2 | 0.1 |
| 1,2-dichloroethane | less than 0.001 | (mg/l) | JIS K 0125 5.2 | 0.04 |
| 1,1-dichloroethylene | less than 0.001 | (mg/l) | JIS K 0125 5.2 | 0.2 |
| cis-1,2-dichloroethylene | less than 0.001 | (mg/l) | JIS K 0125 5.2 | 0.4 |
| 1,1,2-trichloroethane | less than 0.001 | (mg/l) | JIS K 0125 5.2 | 0.06 |
| 1,3-dichloropropene | less than 0.001 | (mg/l) | JIS K 0125 5.2 | 0.02 |
| Benzene | 0.13 | (mg/l) | JIS K 0125 5.2 | 0.1 |
| Thiram | less than 0.001 | (mg/l) | Solid-phase extraction HPLC | 0.06 |
| Simazine | less than 0.001 | (mg/l) | Solid-phase extraction GC/MS | 0.03 |
| Thiobencarb | less than 0.001 | (mg/l) | Solid-phase extraction GC/MS | 0.2 |
| (F) Fluorine | 310 | (mg/l) | JIS K 0102 34.2 | 15 |
| (DXNs) Dioxins | 1800 | (Pg-TEQ/l) | JIS K 0312 (1999) | 10 |

Figure 8. Post-Treatment Drainage

| Item | Results of Measurement | | Measurement Method | Drainage Reference Value |
|---|---|---|---|---|
| Water Temperature (°C) | 17 | (°C) | | |
| SS | 21 | (mg/l) | As in Exhibit 8 of Official Notice No. 59 of Ministry of the Environment | 60 |
| n-Hex Extracted substances | 1.1 | (mg/l) | As in Exhibit 4 of Official Notice No. 64 of Ministry of the Environment | 5 (30) |
| (T-N) Total nitrogen | 570 | (mg/l) | JIS K 0102 45.2 | 120 (60) |
| (T-P) Total phosphorus | 0.04 | (mg/l) | JIS K 0102 46.3 | |
| (Cd) Cadmium | 14 | (mg/l) | JIS K 0102 55-2 | 0.1 |
| (Pb) Lead | less than 0.01 | (mg/l) | JIS K 0102 54-2 | 0.1 |
| (6-Cr) Chromium (VI) | less than 0.05 | (mg/l) | JIS K 0102 65-2 | 0.5 |
| (As) Arsenic | less than 0.01 | (mg/l) | JIS K 0102 61-2 | 0.1 |
| (T-CN) Total cyanogen | less than 0.1 | (mg/l) | JIS K 0102 38-2 | 1 |
| (T-Hg) Total mercury | less than 0.0005 | (mg/l) | As in Exhibit 1 of Official Notice No. 59 of Ministry of the Environment | 0.005 |
| PCBs | less than 0.0005 | (mg/l) | As in Exhibit 3 of Official Notice No. 59 of Ministry of the Environment | 0.003 |
| Trichloroethylene | 0.002 | (mg/l) | JIS K 0125 5.2 | 0.3 |
| Tetrachloroethylene | less than 0.001 | (mg/l) | JIS K 0125 5.2 | 0.1 |
| 1,1,1-trichloroethane | less than 0.001 | (mg/l) | JIS K 0125 5.2 | 3.0 |
| Dichloromethane | less than 0.001 | (mg/l) | JIS K 0125 5.2 | 0.2 |
| Carbon tetrachloride | less than 0.001 | (mg/l) | JIS K 0125 5.2 | 0.02 |
| (Se) Selenium | less than 0.01 | (mg/l) | JIS K 0102 67.2 | 0.1 |
| 1,2-dichloroethane | less than 0.001 | (mg/l) | JIS K 0125 5.2 | 0.04 |
| 1,1-dichloroethylene | less than 0.001 | (mg/l) | JIS K 0125 5.2 | 0.2 |
| cis-1,2-dichloroethylene | less than 0.001 | (mg/l) | JIS K 0125 5.2 | 0.4 |
| 1,1,2-trichloroethane | less than 0.001 | (mg/l) | JIS K 0125 5.2 | 0.06 |
| 1,3-dichloropropene | less than 0.001 | (mg/l) | JIS K 0125 5.2 | 0.02 |
| Benzene | less than 0.001 | (mg/l) | JIS K 0125 5.2 | 0.1 |
| Thiram | less than 0.001 | (mg/l) | Solid-phase extraction HPLC | 0.06 |
| Simazine | less than 0.001 | (mg/l) | Solid-phase extraction GC/MS | 0.03 |
| Thiobencarb | less than 0.001 | (mg/l) | Solid-phase extraction GC/MS | 0.2 |
| (F) Fluorine | 7.5 | (mg/l) | JIS K 0102 34.2 | 15 |
| (DXNs) Dioxins | 0.58 | (Pg-TEQ/l) | JIS K 0312 (1999) | 10 |

Fig.10

|  | A Method | High-Temperature and High-Pressure Autoclave Method | Superconductive Non-Liquid-Cooling-Type Magnet Method of the Present Invention |
|---|---|---|---|
| Basic Method | A boiling non-pressure method | A high-temperature and high-pressure batch method | A method for continuously treating electrolytic water with a superconductive high-magnetic force |
| Ratio of Solids to Liquid | 1:5 (coal ash) : (NaOH liquid) | 1:3 | 1:3 |
| Method for Separating Solids from Liquid | Filter press | Filter press or decanter, or a centrifugal separator | Ring-tube method |
| Concentration of NaOH | 2N | 3.5N | 2N |
| Reaction Time | 6H | 3H–4H | 1–2 minutes |
| Pressure | 1 kg / cm$^2$ (normal atmospheric pressure) | 8 kg / cm$^2$ | 1 kg / cm$^2$ (normal atmospheric pressure) |
| Temperature | 98°C | 174°C | 100°C–150°C |
| Production Capacity/H | 1.5 tons / H | 1/3 of capacity of an autoclave / 3H–4 H | The required volume can be produced continuously. |
| Pretreatment | No | No | Pretreatment with inorganic acids or organic acids, when necessary |
| Heat Source | Electricity and dry vapor | Electricity and dry vapor | Electricity |
| Heating Efficiency | Not good | Not good (because of the large capacity of the autoclave) | Very good (because an autoclave method is not used) |

Fig.11

| Facility | Date of Installation | Manufacturing Method | Planned Annual Production | Substance(s) |
|---|---|---|---|---|
| A | Assistance activity in 1989 (NEDO) Installed in 1990 | A boiling non-pressure open type (100°C, normal atmospheric pressure) | 750 tons | Fly ash of coal ash |
| B | May 1998 | Saturated-vapor autoclave method (174°C, 8 kg / cm²) | 200 tons | Incinerated ash of telephone directories, and pulp sludge |
| C | June 1999 | Same as above | 200 tons | Fly ash of coal ash, and aluminum sludge |
| D | November 2000 | Same as above | 200 tons | Fly ash of coal ash, and aluminum sludge |
| E | April 2001 | Same as above | 200 tons | Natural pearlite |
| F | June 2001 | Same as above | 150 tons | Fly ash of coal ash |

METHOD AND DEVICE FOR MANUFACTURING ZEOLITE FROM ASHES RESULTING FROM THE INCINERATION OF COMBUSTIBLE WASTE

RELATED APPLICATION

The present application is based on, and claims priority from, Japanese Application Serial No. 2002-311460 filed Oct. 25, 2002, the disclosure of which is hereby incorporated by reference herein in its entirety.

FIELD OF THE INVENTION

The present invention relates to a method and a device for manufacturing zeolite from ashes resulting from the incineration of combustible waste, wherein dioxins (PCDDs and PCDFs), polychlorinated biphenyls (PCBs), and various kinds of heavy metals or the like are (1) magnetically separated from (a) said ashes that contain dioxins and PCBs, and (b) liquids that contain heavy metals, both of which are contained in, for example, municipal waste, and (2) made harmless, so that zeolite can be generated.

BACKGROUND OF THE INVENTION

Conventionally, usually one of two methods is used to generate zeolite from the ashes of municipal waste that has been incinerated: (1) a boiling non-pressure method, wherein the aforementioned ashes are introduced into a tank into which is put a sodium hydrate of 2 N and a temperature of 100° C. and then mixed so as to generate zeolite in about six hours, and (2) an autoclave method, wherein the ashes are introduced into a high-temperature autoclave, whose temperature is 174° C. and whose pressure is about 8 kgf/cm$^2$, and sodium hydrate of 3.5 N is added and mixed with the ashes so as to generate zeolite in about three hours. FIG. 11 is a table that compares several conventional artificial-zeolite manufacturing facilities. In FIG. 11, "Planned Annual Production" means the planned production volume, except for Facility A. None of the facilities referred to in FIG. 11 can continuously manufacture a large amount of zeolite. Generally speaking, because three processes of separating solids from liquid are required in one production line, it is necessary to use equipment that can perform all three processes, i.e., a solid-liquid separator (that consists of a super-decanter, a centrifugal separator, and a filter press), resulting in high facility costs.

As a problem to be overcome, some chemical substances such as dioxins, PCBs, and heavy metals, which typically are contained in the aforementioned ashes, are highly toxic and adversely affect the environment, thereby causing damage. Therefore, there is a demand for a technique by which to separate, recover, and reuse the above toxic substances in a safe form. For example, when using a thermal dissolving-and-recovery device that utilizes a method for circulating—through a pipe in a heating medium—a solution containing toxic substances, a large amount of energy is spent for heating the heat solvent, and the efficiency of the heat exchanger is extremely poor.

There are two types of methods for separating substances: physical separating methods and chemical separating methods. One advantage of the physical separating method is that no secondary chemical treatment is needed. In a physical separating method, when magnetic separation is performed, it is possible to separate and recover, at high speed, a large amount of microparticles (of atomic/molecular-size) of substances from a suspension liquid in which such microparticles are suspended.

In a physical separating method, it has been discovered that it is possible to attract paramagnetic substances, and even diamagnetic substances, in a ferromagnetic field.

The specific magnetic susceptibilities of diamagnetic substances such as water and silica glass, and of paramagnetic substances such as aluminum and oxygen, are $10^{-3}$ to $10^{-4}$, which are $1/10^6$–$1/10^7$ times as small as the magnetization intensity of ferromagnetic substances, which is $10^3$. Therefore, the energy of said nonmagnetic substances have conventionally been recognized as so small that it can be ignored.

Magnets that typically are used in our daily lives have a magnetism of about 100 gauss (which equals 0.01 T [tesla]). The magnetism of a magnet that has a magnetic field of 10 T is $10^3$ times larger than that of a typical daily-use magnet. Because magnetic energy is proportional to the square value of the magnetism of a magnetic field, nonmagnetic elements can be separated in a ferromagnetic field that exceeds 10 T.

As a magnetic system for separating and removing substances by a magnetic force, there has conventionally been used a system wherein (1) plural solenoid coils of different magnetic strengths are parallelly installed on the outside of a separating cylinder, and (2) plural separating cylinders are parallelly arranged so as to separate and recover substances that are desired to be magnetically attracted, separated, and recovered. Such a system is disclosed in Japanese Published Patent Application No. 2000-296303.

SUMMARY OF THE INVENTION

However, a conventional high-temperature (boiling) non-pressure method, or autoclave method, for manufacturing zeolite requires too much time and costs too much to be a practical method of generating zeolite. Also, because that method is a batch-type method, it is impossible to continuously manufacture zeolite by that method.

When nonmagnetic elements, in addition to ferromagnetic elements and paramagnetic elements, are to be attracted and separated using a conventional method, it is inevitable that the entire system becomes a large-scale one. This is because, in order to generate a high magnetic force, it is necessary to use nitrogen gas to cool the magnets that are used in the separation process. In addition, power consumption at the time of operating such a system is as much as about 60 kW/sec, which is too high. Furthermore, with a conventional method, the speed of a separator is only about 5 rotations per minute, and so it is impossible to continuously operate such a separator at high speed.

For the purpose of solving the above-mentioned problems, one object of the present invention is to provide a method and a device for manufacturing zeolite from a liquid that is contained in the aforementioned ashes, with said method and device being characterized such that:

(1) dioxins (PCDDs and PCDFs), PCBs, and heavy metals are magnetically separated from a liquid that contains such toxic substances, so that the aforementioned ashes made will be harmless;

(2) at the same time, raw materials from which zeolite is manufactured can be efficiently obtained from the aforementioned harmless ashes, and (3) it is possible to reduce the power consumption necessary and to continuously operate said device at high speed.

For the purpose of achieving the above-mentioned object, a first aspect of the invention comprises (1) a step for (a) introducing the aforementioned ashes into a first tank 2 so as to form a liquid that contains (i) an alkaline aqueous solution as a solvent, or (ii) a liquid that contains water, air, and electrolytic water, and (b) continuously reintroducing that liquid into a first substance-separating/recovering device 1A so as to make that liquid harmless; and a step for (c) introducing the clear liquid that has been separated and recovered in said first substance-separating/recovering device 1A and then returned into the first tank 2, into a second tank 3 so as to convert that liquid into a heat-treated liquid that contains an alkaline aqueous solution as a solvent, and (d) continuously reintroducing that heat-treated liquid into a second substance-separating/recovering device 1B so as to crystallize that heat-treated liquid into zeolite that contains tecto-alumino-silicate.

A second aspect of the invention comprises (1) a step for (a) introducing the aforementioned ashes into a first tank 2 so as to form a liquid that contains, as a solvent, an alkaline aqueous solution or water, air and electrolytic water, and (b) continuously reintroducing that liquid into a substance-separating/recovering device 1A so as to make that liquid harmless; and (2) a step for (a) introducing the clear liquid that has been separated and recovered in said substance-separating/recovering device 1A and then returned to the first tank 2, into a second tank 3 through a buffer tank 5 so as to convert that liquid into a heat-treated liquid that contains an alkaline aqueous solution as a solvent, and (b) continuously reintroducing that liquid into said substance-separating/recovering device 1A so as to crystallize that heat-treated liquid into zeolite that contains tecto-alumino-silicate.

A third aspect of the invention is a method as set forth in the second aspect of the invention, with said method comprising: (1) a step in which said first and second substance-separating/recovering devices 1A, 1B (a) centrifugally separate substances that are desired to be separated and recovered from said liquid while a centrifugal force is applied to the introduced liquid by using a rotor that rotates at high speed, and (b) change the state of said liquid into a mist-like state; and (2) a step for (c) impressing, on said liquid whose state is changed into a mist-like state, a superconductive magnetic field that corresponds to the magnetization intensity of the substances that are to be magnetically attracted, separated, and recovered, and (d) separating and recovering said substances.

A fourth aspect of the invention is a method as set forth in the third aspect of the invention, with said method characterized such that said substances to be magnetically attracted, separated, and recovered are dioxins (PCDDs and PCDFs).

Furthermore, a fifth aspect of the invention is a method as set forth in, the third aspect of the invention, with said method characterized such that said substances to be magnetically attracted, separated, and recovered are heavy metals.

According to the above-described method, the aforementioned ashes are introduced into a first tank 2 so as to convert them into a liquid that contains, as a solvent, an alkaline aqueous solution or water, air, and electrolytic water, and that is then continuously reinjected into the first substance-separating/recovering device 1A. Then the clear liquid that has been separated and recovered in said first substance-separating/recovering device 1A and then returned to the first tank 2 (1) is introduced into the second tank 3 so as so as to form a heat-treated liquid that contains, as a solvent, an alkaline aqueous solution, and (2) is continuously reintroduced into the second substance-separating/recovering device 1B so as to crystallize that heat-treated liquid into zeolite that contains tecto-alumino-silicate.

A superconductive magnet is used to separate substances that are desired to be magnetically attracted, separated, and recovered. When a superconductive substance is cooled and its temperature is lowered to a certain degree, said superconductive substance loses its resistance and gains complete conductivity. Said superconductive substance that has complete conductivity is used to form a coil, thereby creating an electromagnet that is called a superconductive magnet. Conventionally, liquid helium is used for cooling such a superconductive magnet, but recently a superconductive magnet that is not a liquid-cooled type (hereinafter referred to as "a dry magnet") and that is produced by using a high-temperature superconductor and does not require liquid helium, has been developed, and such dry magnets are used in the substance-separating/recovering device of the present invention. Because such dry magnets are not of a liquid-cooled type, the substance-separating/recovering device does not require an internal cooling system and therefore said device can be small in size. In addition, the device's power consumption is reduced.

According to the present invention, centrifugal force is applied to the liquid that (a) is introduced into the substance-separating/recovering device and (b) contains substances to be magnetically attracted, separated, and recovered; so that the substances to be separated and recovered can be separated centrifugally. In the present invention, the amount of centrifugal force to be applied is adjusted according to the weight of the substances that are to be separated in a first treatment process. The state of said liquid is changed into a mist-like state by the applied centrifugal force.

Also, the present invention utilizes a second treatment process, wherein a superconductive magnetic field using dry magnets is impressed on said liquid, whose state has been changed into a mist-like state, so that substances that are desired to be magnetically attracted, separated, and recovered can be separated and recovered from said liquid. The strength of the superconductive magnetic field to be impressed upon said liquid is set according to the magnetization intensity of the substances that are to be magnetically attracted, separated, and recovered. By degaussing the dry magnets, the substances that have been separated by the action of the superconductive magnetic field are made to drop onto a substance-removing slide that is installed at the bottom of the substance-separating/recovering device, thereby being removed from of the substance-separating/recovering device. According to the present invention, because the dry magnets can be magnetized or degaussed in about one minute, it is possible to continuously operate at high speed a substance-separating/recovering device using a superconductive magnetic field.

As described above, the present invention has both a first treatment process and the second treatment process. In the first treatment process, the substances to be centrifugally separated and recovered can be separated; and in the second treatment process, the substances to be magnetically attracted, separated and recovered can be magnetically separated by using dry magnets. Therefore, the substances to be magnetically attracted, separated, and recovered can be magnetically separated with good efficiency.

According to the present invention, dioxins (PCDDs and PCDFs), PCBs, heavy metals, and the like are magnetically separated from a liquid (that contains dioxins, PCBs sand various kinds of heavy metals, and that is obtained from the ashes of municipal waste that has been incinerated), so that the aforementioned ashes can be made harmless and so that raw materials for manufacturing zeolite can be efficiently produced from the harmless ashes. The size of the substance-separating/recovering device can be small, and the amount of power that is needed to operate it can be made low. Also, the device can be continuously operated at a high speed, so that the substances can be efficiently separated and recovered.

BRIEF DESCRIPTION OF THE DRAWINGS

FIG. 4 is a table that shows the results of an experiment wherein liquid that was obtained by dissolving the residua (ashes) of combustion into water was magnetically separated by the substance-separating/recovering devices utilizing a superconductive magnetic field.

FIG. 7 is a table that shows—for measurements of various kinds of hazardous substances that are contained in pretreatment drainage liquid and that are obtained by dissolving the ashes in the water as a solvent and then magnetically separating and recovering those substances—the measurement methods, drainage reference values, and results of the measurements.

FIG. 8 is a table that shows—for measurements of various kinds of hazardous substances that are contained in post-treatment drainage—the measuring methods, drainage reference values, and results of the measurements.

FIG. 10 is a table that compares two conventional systems for manufacturing artificial zeolite with the zeolite manufacturing system of the present invention (a method for continuously treating electrolytic water using superconductive nonliquid type magnets).

FIG. 11 is a table that compares several conventional artificial-zeolite manufacturing facilities.

Figure 1:
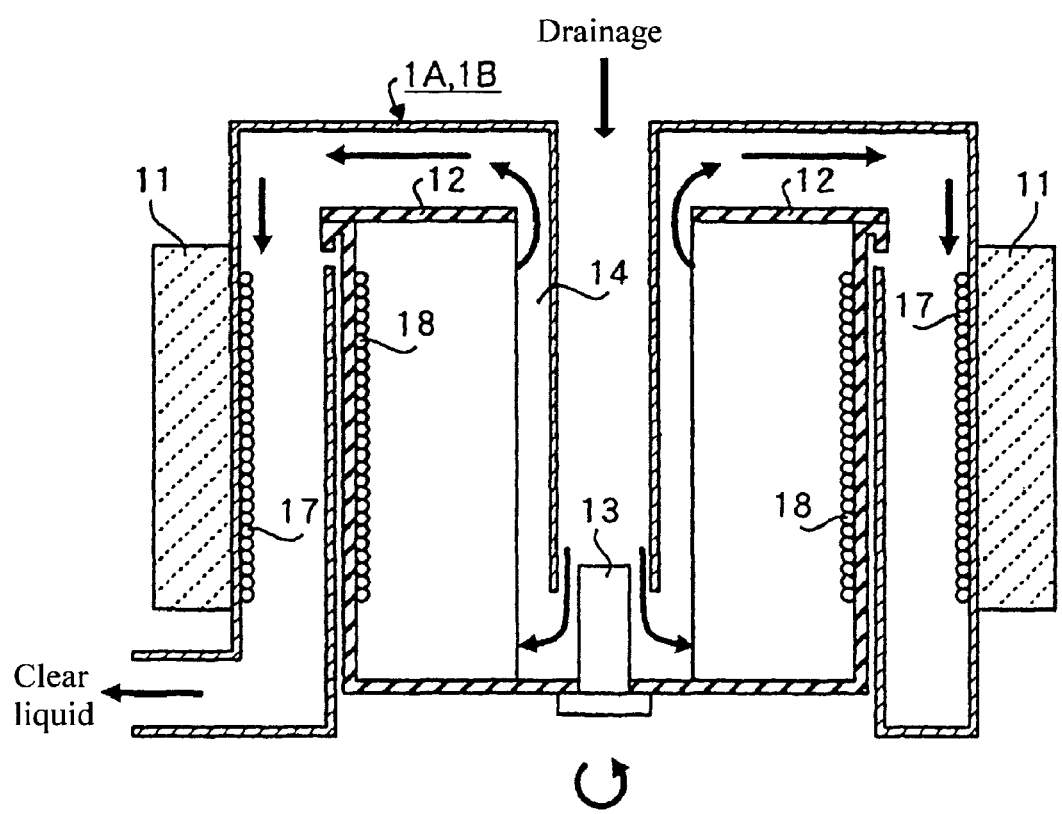
FIG. 1 is a schematic cross-sectional view illustrating the principle of the device that is used in the present invention.

EXPLANATION OF NUMBERS IN THE DRAWINGS 1A, 1B Substance separating/recovery device
2 First tank
3 Second tank
4 Switching valve
5 Buffer tank
11 Dry magnets
12 Rotor
13 Central shaft
14 Drain pipe
17 Substances to be magnetically attracted, separated, and recovered
18 Substances to be centrifugally separated and recovered
20 Motor
21 Scraping blades
22 Vane shaft
23 Block
24 Stopper
25 Substance-removing slide
26 Exhaust pipe
27 Drain port

DETAILED DESCRIPTION OF THE INVENTION

Embodiments of the present invention will now be described with reference to the drawings. FIG. 1 is a schematic cross-sectional view illustrating the principle of the present invention. In FIGS. 1, 1A and 1B designate substance-separating/recovering devices that utilize a superconductive magnetic field (hereinafter "substance-separating/recovering devices"); 11 are magnets; 12 are rotors that rotate at high speed around a central shaft 13; 14 is a drain pipe that serves as a passage for draining liquid that is introduced into the substance-separating/recovering devices 1A, 1B using a superconductive magnetic field; 17 designates substances that pass through the drain and that are to be magnetically attracted, separated, and recovered; and 18 designates substances that pass through the drain and that are to be centrifugally attracted, separated, and recovered. Also, the substances to be magnetically attracted, separated, and recovered are dissolved in a liquid that contains, as a solvent, either (a) sodium hydrate as a solvent or (b) water, air and electrolytic water, and that is continuously and circularly reintroduced into the substance-separating/recovering devices 1A, 1B.

Figure 5:
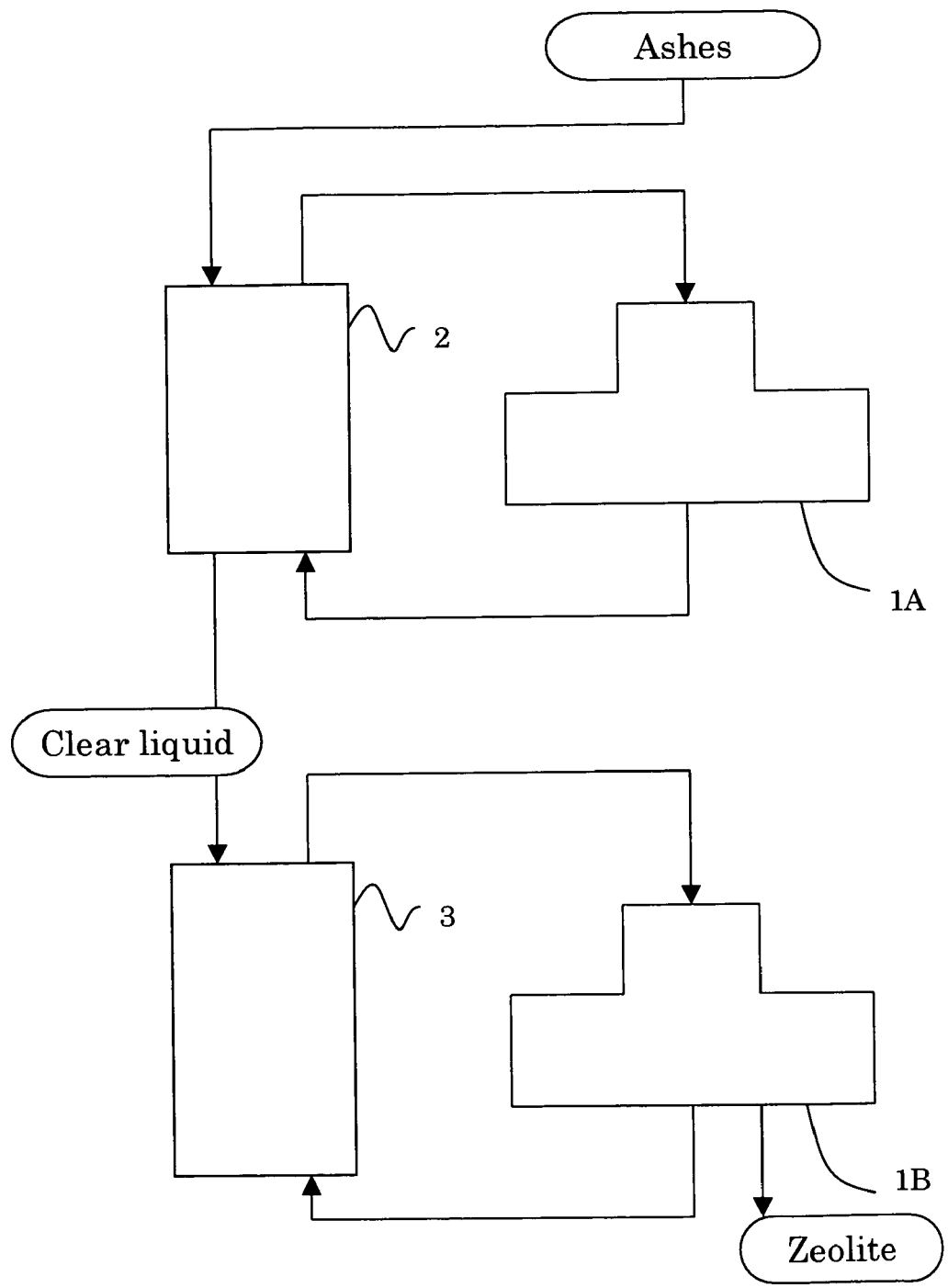
FIG. 5 is a schematic diagram showing the structure of a zeolite-manufacturing device of the present invention.

As shown in FIGS. 1 and 5, the present invention comprises:

(1) a step for (a) introducing ashes of municipal waste that has been incinerated into a first tank 2 so as to form a liquid that contains, as a solvent, an alkaline aqueous solution, or water, air and electrolytic water, and (b) continuously reintroducing that liquid into the first substance-separating/recovering device 1A so as to make that liquid harmless, and (2) a step for (c) introducing the clear liquid that has been separated and recovered in said first substance-separating/recovering device 1A and then returned to the first tank 2, into a second tank 3 so as to obtain a heat-treated liquid that contains, as a solvent, an alkaline aqueous solution, and (d) continuously reintroducing the heat-treated liquid into the second substance-separating/recovering device 1B so as to crystallize that heat-treated liquid into zeolite that contains tecto-alumino-silicate.

In the first tank 2, the ashes are formed into a liquid that contains, as a solvent, an alkaline aqueous solution, or water, air, and electrolytic water, and that is then introduced into the first substance-separating/recovering device 1A, which utilizes a superconductive magnetic field. The introduced drainage liquid passes through a drain pipe 14 and is then transferred to a rotor 12 that rotates at high speed. Then, a centrifugal force is applied to the drainage by the rotor 12, and substances 18 that are desired to be centrifugally separated and recovered are separated from the drainage and precipitated around the inside wall of the rotor 12. The precipitated substances 18 are then removed by the action of the scraping blades that are mounted inside of the rotor 12, and are made to drop to the bottom of the substance-separating/recovering device 1A, which utilizes a superconductive magnetic field.

The clear liquid that is discharged from the substance-separating/recovering device 1A is returned to the first tank 2.

The clear liquid that is returned to the first tank 2 is introduced into the second tank 3, where the clear liquid is then introduced into the second substance-separating/recovering device 1B (which utilizes a superconductive magnetic field) together with, for example, a solvent of caustic soda, namely sodium hydrate or the like, as an alkaline aqueous solution of 2 N–5 N, whose temperature is about 100° C.–200° C. The introduced clear liquid passes through the drain pipe 14 and is transferred to the rotor 12, which rotates at high speed. When a centrifugal force is applied to the clear liquid by the rotor 12, the substances 18 that are desired to be centrifugally separated and recovered are then separated from the clear liquid and precipitated around the inside wall of the rotor 12. The precipitated substances 18 are then removed by the action of the scraping blades that are mounted inside of the rotor 12, and those substances are then made to drop to the bottom of the second substance-separating/recovering device 1B, which utilizes a superconductive magnetic field. The clear liquid that is discharged from the second substance-separating/recovering device 1B is returned to the second tank 3.

Also, the applied centrifugal force changes the state of the drainage to a mist-like state that consists of drops whose size are about 7 μm; and the drainage overflows above the upper surface of the rotor 12. The substances 17 that are in the drainage, and that are to be magnetically attracted, separated and recovered, are separated from the drainage by the superconductive-magnetic-field action of the dry magnet 11, and then the substances 17 are magnetically attracted onto the inner wall of the substance-separating/recovering devices 1A, 1B, which utilize a superconductive magnetic field, onto which dry magnets 11 are attached, as shown in FIG. 1. Then, by degaussing the dry magnets 11, the substances 17 are made to drop from the inner wall so that they can then be recovered.

Figure 6:
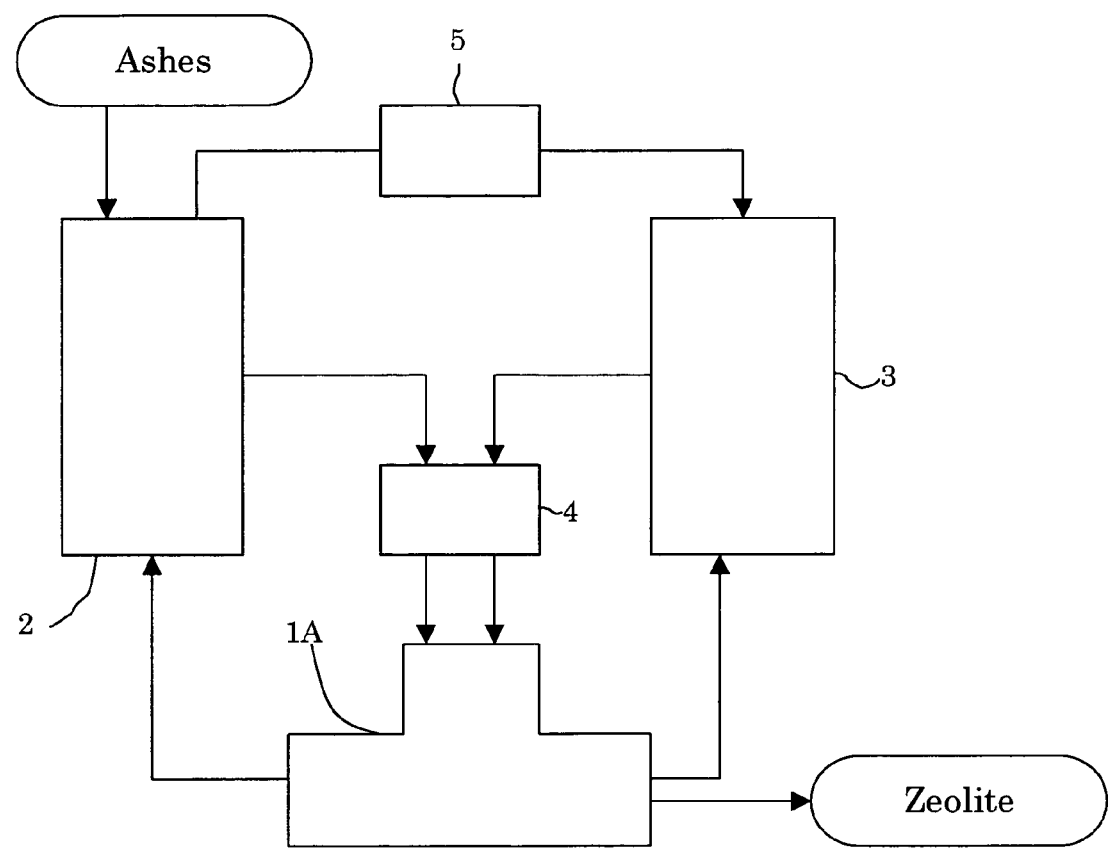
FIG. 6 s a schematic diagram showing the structure of a zeolite-manufacturing device in another embodiment of the present invention.

FIG. 6 shows a schematic diagram of another embodiment of the present invention. In this embodiment, the steps for making the aforementioned substances harmless and generating zeolite do not use both of the substance-separating/recovering devices 1A and 1B. Instead, only a substance-separating/recovering device 1A is used for both steps. That is to say, the drainage that is introduced into the substance-separating/recovering device 1A from the first tank 2 is (1) formed into a clear liquid by separating the substances 17 from the drainage, (2) removed from of the substance-separating/recovering device 1A by using a superconductive magnetic field, (3) returned into the first tank 2, and (4) introduced into the substance-separating/recovering device 1A by using a superconductive magnetic field, via a switching valve 4. Also, the drainage that is introduced into the substance-separating/recovering device 1A from the second tank 3, is (1) formed into a clear liquid by separating the substances 17 from the drainage, (2) removed from of the substance-separating/recovering device 1A using a superconductive magnetic field, (3) returned to the second tank 3, and (4) introduced into the substance-separating/recovering device 1A via a switching valve 4. The switching valve 4 serves to control the introduction of the liquid into the two tanks and to switch the introduction of the liquid into either the first tank 2 or the second tank 3 (and into the substance-separating/recovering device 1A) as appropriate.

The first tank 2 and the second tank 3 are connected by a buffer tank 5. That is to say, the clear liquid that is returned to the first tank 2 is introduced into the second tank 3 (which contains, for example, sodium hydrate as an alkaline aqueous solution) through the buffer tank 5 that is used to store the clear liquid until it reaches a predetermined volume. Then, the liquid is introduced again, together with the drainage, into the substance-separating/recovering device 1A via the switching valve 4.

Therefore, dioxins (PCDDs and PCDFs), PCBs, heavy metals, and the like can be magnetically separated from the drainage that contains dioxins, PCDs, and various kinds of heavy metals; and the device can be continuously operated to make into a harmless condition refuse such as coal ashes and municipal waste, both of which contain hazardous substances. In addition, because the ashes of combustible wastes (such as coal ashes and municipal waste) are heat-treated in an alkaline solution of sodium hydrate (caustic soda) or the like, and then introduced into the substance-separating/recovering device 1A or 1B, it is possible to easily transform the ashes into artificial zeolite.

Figure 2:
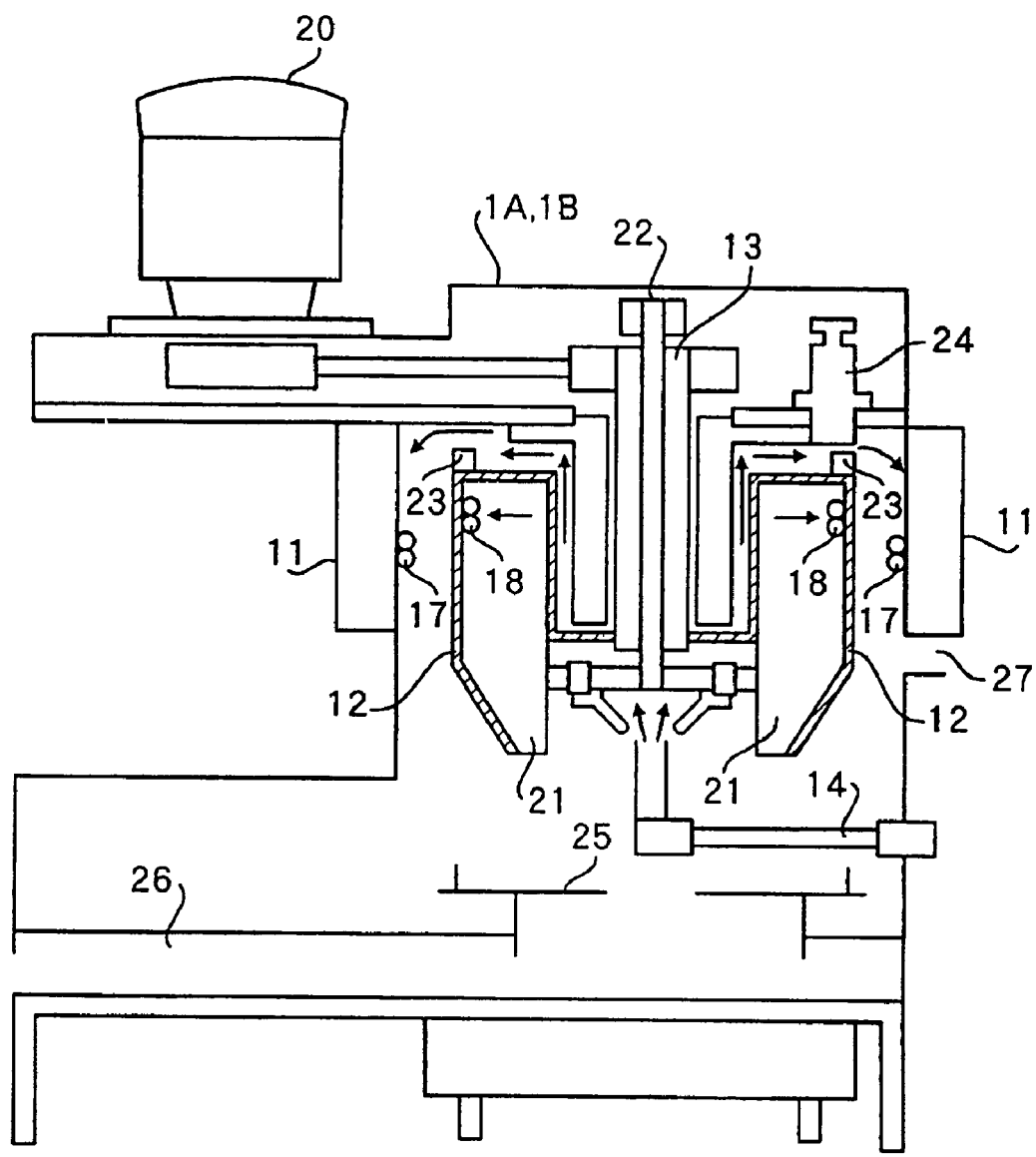
FIG. 2 is a cross-sectional view illustrating one detailed example of the structure of the substance-separating/recovering devices utilizing a superconductive magnetic field, in an embodiment of the present invention.

FIG. 2 shows one detailed example of the structure of the substance-separating/recovering devices 1A, 1B, utilizing a superconductive magnetic field, in an embodiment of the present invention. The substance-separating/recovering devices 1A, 1B are formed into rectangular shapes, and they are designed to efficiently separate and recover the aforementioned substances 17, 18 by making the drainage remain inside the device for a longer time than with a conventional method, so that both the magnetically-attracting/separating time and the magnetically-attracting/separating area can be increased. In FIG. 2, 12 designates a rotor, which is indicated by slanted lines; 20 designates a motor for rotating the rotor around the central shaft 13; the two 21s are two vane-like scraping blades that are attached inside the rotor 12; 22 is the vane shaft of the scraping blades 21, whose axial center is the same as the axial center of the central shaft 13 of the rotor 12; 23 are blocks; 24 is a stopper for braking the central shaft 13; 25 is a substance-removing slide; 26 is an exhaust pipe; and 27 is a drain port for discharging the clear liquid. Two scraping plates 21 that face each other are affixed at the soffit of the vane shaft 22. Moreover, the said two scraping plates 21, which are located inside of the rotor 12, rotate around the same axial center as that of the said rotor 12.

In this embodiment of the present invention, a pump introduces the drainage (which contains the aforementioned substances 17) into the substance-separating/recovering devices 1A, 1B, which utilize a superconductive magnetic field. The introduced drainage is transferred into the rotor 12 through a drain pipe 14, as shown in FIG. 2.

Then, a centrifugal force is applied to the drainage by the action of the rotor 12, which rotates at high speed. Substances 18 that are desired to be centrifugally separated and recovered are separated from the drainage, to which the centrifugal force is applied, and then are precipitated around the inside wall of the rotor 12.

Then, by rotating the vane shaft 22, the scraping blades 21 are rotated in a direction that is opposite to the rotational direction of the rotor 12, so that the precipitated substances 18 that are desired to be centrifugally separated and recovered are scraped off from around the inside wall of the rotor 12. Here, the vane shaft 22 can be rotated manually or automatically. The scraped-off substances 18 that are desired to be centrifugally separated and recovered are made to drop onto the substance-removing slide 25 are transferred to the exhaust pipe 26 through an opening hole of the substance-removing slide 25, and then discharged through the exhaust pipe 26 to the outside of the substance-separating/recovering devices 1A, 1B.

Then, the state of the drainage, to which a centrifugal force is applied by the rotor that rotates at high speed, is changed to a mist-like state, and then it overflows onto the upper surface of the rotor 12 from the inside of the rotor 12, in the direction indicated by arrows in FIG. 2. The mist-like drainage that overflows onto the upper surface of the rotor 12 is separated from the drainage liquid by the superconductive magnetic field of the dry magnets 11, whose magnetism is adjusted according to the magnetization rate of the substances 18 to be magnetically separated and recovered, and said mist-like drainage is magnetically attracted onto the inner walls of the substance-separating/recovering devices 1A, 1B, where the dry magnets 11 are installed, as shown in FIG. 2.

The substances 17 that have been magnetically attracted onto the inner walls of the substance-separating/recovering devices 1A are (1) made to drop onto the substance-removing slide 25 from the inner walls of said devices 1A, 1B by degaussing the dry magnets 11 at an appropriate time, (2) transferred to the exhaust pipe 26 through an opening hole in the substance-removing slide 25, and (3) discharged through the exhaust pipe 26 to the outside of the substance-separating/recovering devices 1A, 1B. Because the substances 17 are separated from the drainage liquid, that drainage liquid is converted into a clear liquid; and the clear liquid is discharged from the drain port 27 to the outside of the substance-separating/recovering devices 1A, 1B.

Figure 3:
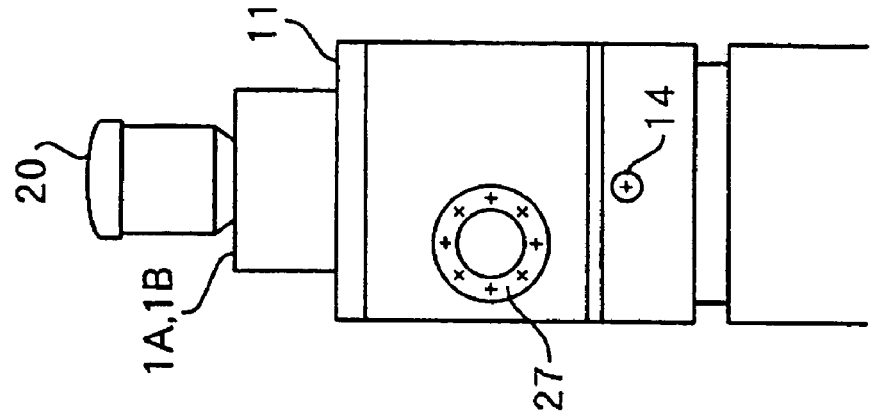
FIG. 3 consists of a front view (A) and a side view (B) of a substance-separating/recovering device 1 utilizing a superconductive magnetic field, in one embodiment of the present invention.
Figure 3:
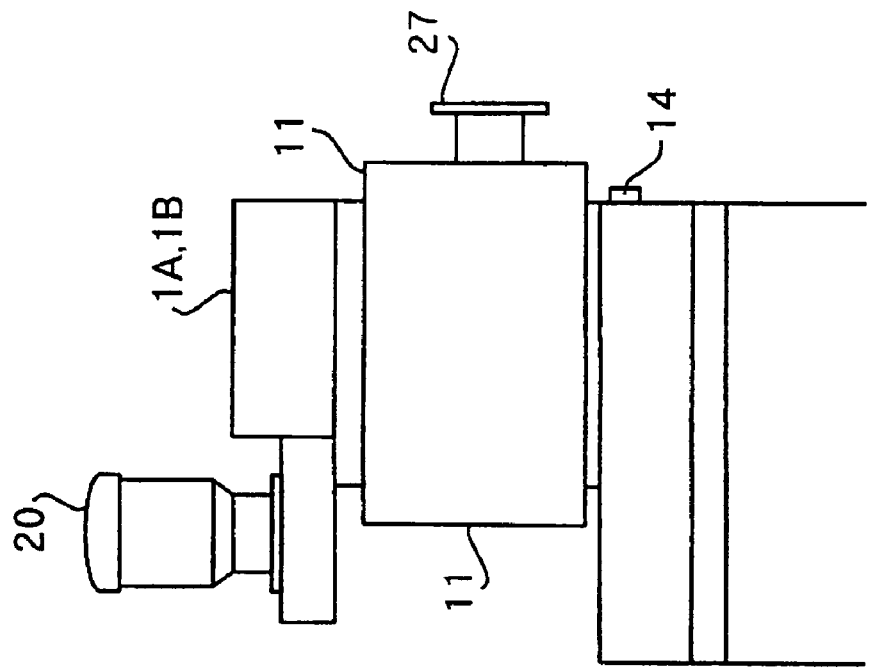

FIG. 3(A) is a front view of a substance-separating/recovering device 1 that utilizes a superconductive magnetic field, in one embodiment of the present invention. FIG. 3(B) is a side view of the substance-separating/recovering device 1. In the substance-separating/recovering device 1 shown in FIG. 3, the driving power of a motor 20 is, for example, 3.7 kW, and the device's processing flow rate is 200 L per minute. The size of the substance-separating/recovering device 1 is not limited to the one shown in FIG. 3, and can be small, having a motor 20 that has a driving power of, for example, 2.2 kW.

As described above, the power consumption of the substance-separating/recovering devices 1A, 1B of the present invention is, for example, only about 3.7 kW and is much less than that of a device of the prior art, which is, for example, about 60 kW. According to the present invention; first, the rotor 12 is rotated at high speed (for example, at 4,000 rotations/minute) so as to separate from the drainage the substances to be centrifugally separated and recovered; and then, the substances 18 to be magnetically attracted, separated, and recovered are separated by the action of the dry magnets 11. Thus, the substances can be efficiently separated and recovered.

Next, an embodiment of the substance-separating/recovering devices 1A, 1B that use a superconductive magnetic field according to the present invention will be described.

In this embodiment, the substance-separating/recovering devices 1A and 1B are used to are separate dioxins (PCDDs and PCDFs) from the aforementioned ash liquid, which is obtained by dissolving in water the ashes of municipal waste that has been incinerated.

If dioxins are removed in a scientific manner, a large-scale device is required, and the processing cost is high. However, by using the substance-separating/recovering device 1 that uses a superconductive magnetic field, a high level of magnetism, of about 1,000 gauss (0.1 T), is applied to the ashes that contain dioxins, and thereby the dioxins can be separated and recovered. For example, the concentrations of the dioxins (PCDDs and PCDFs) that are contained in said incinerated-ash liquid, is initially 110 picograms.

However, by using the substance-separating/recovering devices 1A, 1B of the present invention, the concentrations of the dioxins becomes less than the lower limit of detection, because almost all the dioxins are separated from said incinerated-ash liquid.

Also, the dioxins that were contained in the cleaning liquid that is used to wash off the soot that has adhered to the chimney of an incineration site can be separated from the cleaning liquid by using the substance-separating/recovering devices 1A, 1B. The initial concentration of dioxins in the cleaning liquid was 360,000 picograms. But as a result of the above-mentioned separation, about 99% of the dioxins were separated and removed from the cleaning liquid.

Also, by using the substance-separating/recovering devices 1A, 1B, PCBs can be separated from a liquid that contains them.

Furthermore, the substance-separating/recovering devices 1A, 1B can separate not only the above-mentioned dioxins and PCBs, but also a variety of heavy metals, from a liquid. For example, iron particles and Mn, which are ferromagnetic particles, can be magnetically attracted by impressing a superconductive magnetic field of about 1,000 gauss (0.1 T) using a substance-separating/recovering device 1, which utilizes a superconductive magnetic field. Also, Ca and Mg, which are weakly magnetic particles, can be magnetically attracted by impressing a superconductive magnetic field of about 10,000 gauss (1 T). Gold and nitrogen, which are diamagnetic particles, can also be magnetically attracted by impressing a superconductive magnetic field of about 50,000 gauss (5 T). Thus, gold or nitrogen can be separated from a liquid that contains gold or nitrogen.

FIG. 4 shows the results of an experiment wherein the liquid that was obtained by dissolving the combustion residua (ashes), whose moisture content was 70%–90%, into water, was magnetically separated by the substance-separating/recovering devices 1A, 1B that utilized a superconductive magnetic field. In this experiment, 40 liters of liquid were treated per minute, the unit of concentration was mg/L, and the analysis method used was that of flame atomic absorption spectrometry.

More concretely, by using the substance-separating/recovering devices 1A, 1B, which utilize a superconductive magnetic field, of the present invention, the following substances can be magnetically attracted and separated:

Fe, Co, and Ni, which are ferromagnetic particles;

Ti, V, Cr, Mn, Y, Mo, Tc, Ru, Rh, Pb, Ta, W, Re, Os, Ir, Pt, Ce, Pr, Nd, Sm, Eu, Gd, Tb, Dy, Ho, Er, Tm, Yb, U, Pu, and Am, which are weakly magnetic particles, both in their respective forms as elementary substances and even when they are made into compounds;

Li, Na, K, Mg, Ca, Sr, Ba, Sc, La, Zr, Hf, Nd, Al, Ca, Sr, Lu, and O, which are weakly magnetic only when they are in the form of an elementary substance; and Rb, Cs, Cu, Au, Ti, and N, which are weakly magnetic only when they are in the form of oxides.

A substance that is weakly magnetic only when it is in the form of elementary substance can be magnetically attracted and separated as an elementary substance, and a substance that is weakly magnetic only when it is in the form of an oxide can be magnetically attracted and separated as an oxide.

Particles other than the above-mentioned substances are nonmagnetic, but if said other particles are combined with magnetic particles, said other particles can also be magnetically attracted and separated in a way similar to that used for magnetic particles. For example, Si and As are nonmagnetic, but if magnetic substances (seed agents) are added thereto, Si and As can have magnetism and be also magnetically attracted and separated. Iron powder, magnetite, iron hydroxide, or the like can be used as a seed agent.

Experimental examples for magnetically attracting, separating, and recovering from drainage that was obtained by dissolving the ashes of incinerated sewage sludge into water as a solvent will be described with reference to FIGS. 7 and 8. FIG. 7 is a table that shows the results of measurements of various kinds of hazardous substances that are contained in the pretreatment drainage. FIG. 8 is a table that shows measurements of various kinds of hazardous substances that are contained in post-treatment drainage. As is shown by these tables, the amount of dioxins contained in the pretreatment drainage significantly decreased, from 1,800 pg-TEQ/l to 0.58 pg-TEQ/l, and the amount of fluorine also decreased, from 310 mg/l to 7.5 mg/l. In addition, BOD decreased from 220 mg/l to 4 mg/l, COD decreased from 280 mg/l to 74 mg/l, and lead decreased from 180 mg/l to less than 0.01 mg/l.

Figure 9:
FIG. 9 shows a comparison of a particle of pretreated fly ash and a particle of post-treated zeolite.
Figure 9:
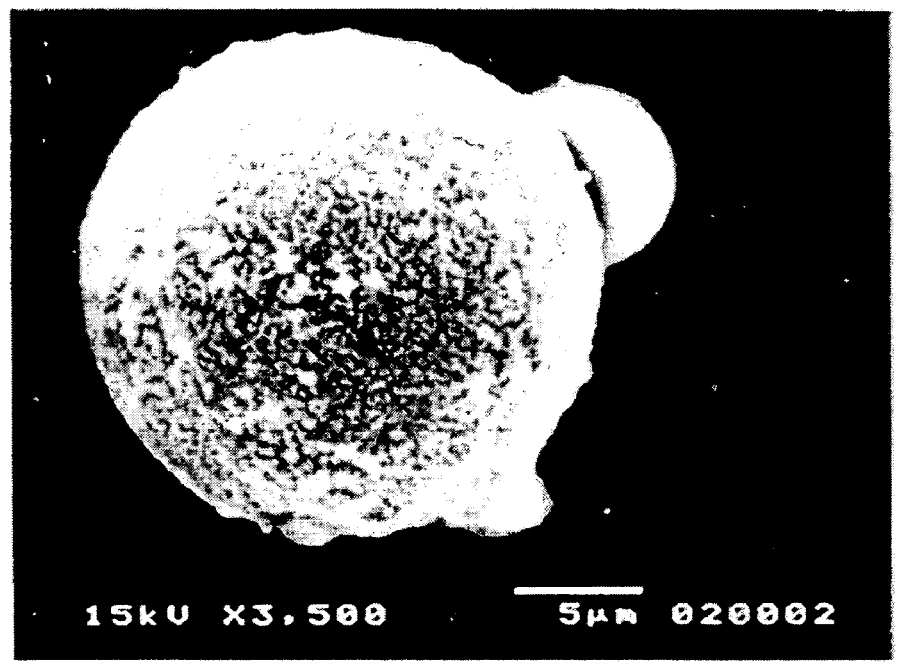

FIG. 9 shows a comparison of a particle of fly ash before treatment and a particle of post-treated zeolite. FIG. 9(A) shows a photo enlargement of a fly-ash particle before treatment, at which time the surface of the particle is smooth. FIG. 9(B) shows a photo enlargement of a particle of zeolite after it has been reacted by a magnetic separator (with about 50,000 gauss) for about one minute. Crystallization is seen on the surface of zeolite.

FIG. 10 is a table that compares two conventional systems for manufacturing artificial zeolite with the zeolite manufacturing system of the present invention. In FIG. 10, the second-from-left column shows the results of method A, a conventional boiling nonpressure method. The center column of the table shows the high-pressure autoclave method, another conventional type of high-temperature and high-pressure batch-system method. The far-right column of the table shows the method of the present invention (a system for continuously treating electrolytic water using superconductive nonliquid-cooled-type magnets). From the above comparison it can be understood that the method of the present invention can continuously manufacture a required volume of zeolite in a reaction time of 1–2 minutes, which is less time than that required by either of the two conventional methods.

According to the present invention, dioxins (PCDDs and PCDFs), PCBs, heavy metals, and the like are magnetically separated from a liquid that contained dioxins, PCBs, and various kinds of heavy metals, and that was contained in the ashes of, for example, municipal waste, so that the ashes can be made harmless, and that, simultaneously, raw materials for manufacturing zeolite can be efficiently generated from the harmless ashes. Also, it is possible to reduce the scale of the substance-separating/recovering device, to reduce the amount of power needed to operate the device, to continuously operate the device at high speed, and to efficiently separate and recover the various substances. If electrolytic water is used as the above-mentioned solvent, separating effects can be further improved. In addition, because the ashes are derived from combustible waste such as municipal waste are heat-treated in an alkaline solution of sodium hydrate (caustic soda) or the like and are continuously and circularly reintroduced into substance-separating/recovering devices 1A, 1B, the ashes of municipal waste that has been incinerated can efficiently be transformed into artificial zeolite.

What is claimed is:

1. A method for manufacturing zeolite from ashes resulting from the incineration of combustible waste (hereinafter "ashes"), with said method comprising:
   (1) a step for (a) introducing the ashes into a first tank (of two tanks) so as to form a liquid that contains, as a solvent, either an alkaline aqueous solution or water, air and electrolytic water, and (b) continuously reintroducing that liquid into a first (of two) substance-separating/recovering device so as to make that liquid harmless; and
   (2) a step for (c) introducing into a second tank the clear liquid that has been separated and recovered in said first substance-separating/recovering device and then returned into the first tank, so as to convert that clear liquid into a heat-treated liquid that contains an alkaline aqueous solution as a solvent, and (d) continuously reintroducing said heat-treated liquid into a second substance-separating/recovering device so as to crystallize that heat-treated liquid into zeolite that contains tecto-alumino-silicate.

2. A method for manufacturing zeolite from the aforementioned ashes, as set forth in claim 1, with said method comprising:
   (1) a step in which said first and second substance-separating/recovering devices (a) centrifugally separate substances that are desired to be centrifugally separated and recovered from said introduced liquid while a centrifugal force is applied to said liquid by using a rotor that rotates at high speed and (b) change said liquid into a mist-like state; and
   (2) a step for (a) impressing onto said liquid, which has been changed into a mist-like state, a superconductive magnetic field that corresponds to the magnetization intensity of the substances to be magnetically attracted, separated, and recovered, and (b) separating and recovering the substances to be magnetically attracted, separated and recovered.

3. A method for manufacturing zeolite from the ashes, as set forth in claim 2, wherein said substances to be magnetically attracted, separated, and recovered are dioxins.

4. A method for manufacturing zeolite from the ashes, as set forth in claim 2, wherein said substances to be magnetically attracted, separated, and recovered are heavy metals.

5. A method for manufacturing zeolite from ashes, with said method comprising:
   (1) a step for (a) introducing the ashes into a first tank so as to obtain a clear liquid that contains, as a solvent, either an alkaline aqueous solution or water, air and electrolytic water, and (b) continuously reintroducing that liquid into a substance-separating/recovering device so as to make that liquid harmless; and
   (2) a step for (a) introducing into a second tank through a buffer tank the clear liquid that has been separated and recovered in said substance-separating/recovering device and then returned to the first tank, so as to convert it into a heat-treated liquid that contains an alkaline aqueous solution as a solvent, and (b) continuously reintroducing the heat-treated liquid into said substance-separating/recovering device so as to crystallize that heat-treated liquid into zeolite that contains tecto-alumino-silicate.

* * * * *